United States Patent
Jang et al.

(10) Patent No.: US 12,184,978 B2
(45) Date of Patent: *Dec. 31, 2024

(54) SENSOR SHIFTING MODULE AND CAMERA MODULE INCLUDING THE SAME

(71) Applicant: Samsung Electro-Mechanics Co., Ltd., Suwon-si (KR)

(72) Inventors: Su Bong Jang, Suwon-si (KR); Sang Jong Lee, Suwon-si (KR); Hee Soo Yoon, Suwon-si (KR); Tae Ho Yun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 232 days.

This patent is subject to a terminal disclaimer.

(21) Appl. No.: 17/968,460

(22) Filed: Oct. 18, 2022

(65) Prior Publication Data
US 2023/0164439 A1 May 25, 2023

(30) Foreign Application Priority Data
Nov. 23, 2021 (KR) ........................ 10-2021-0162476

(51) Int. Cl.
*H04N 23/68* (2023.01)
*G02B 7/08* (2021.01)
(Continued)

(52) U.S. Cl.
CPC ............. *H04N 23/687* (2023.01); *G02B 7/08* (2013.01); *H02K 41/0354* (2013.01);
(Continued)

(58) Field of Classification Search
None
See application file for complete search history.

(56) References Cited

U.S. PATENT DOCUMENTS 10,890,734 B1 * 1/2021 Sharma ..................... H02P 6/30
2021/0173223 A1 6/2021 Seo et al.
(Continued)

FOREIGN PATENT DOCUMENTS

CN 111355872 A 6/2020
CN 112702534 A 4/2021
(Continued)

OTHER PUBLICATIONS

Korean Office Action issued on Feb. 22, 2023, in counterpart Korean Patent Application No. 10-2021-0162476 (7 pages in English, 5 pages in Korean).

*Primary Examiner* — Rodney E Fuller
(74) *Attorney, Agent, or Firm* — NSIP Law

(57) ABSTRACT

A sensor shifting module is provided. The sensor shifting module includes a fixed body; a first movable body movably disposed in the fixed body; a second movable body movably disposed on the first movable body and coupled to an image sensor having an imaging plane oriented in a first direction; and a first driver configured to move the first movable body in a direction orthogonal to the first direction with respect to the fixed body; a second driver configured to rotate the first movable body about an axis parallel to the first direction with respect to the fixed body; and a third driver configured to rotate the second movable body to rotate about an axis orthogonal to the first direction with respect to the first movable body.

20 Claims, 13 Drawing Sheets

(51) Int. Cl.
*H02K 41/035* (2006.01)
*H04N 23/51* (2023.01)
*H04N 23/52* (2023.01)
*H04N 23/55* (2023.01)

(52) U.S. Cl.
CPC ............. *H04N 23/51* (2023.01); *H04N 23/52* (2023.01); *H04N 23/55* (2023.01)

(56) References Cited

U.S. PATENT DOCUMENTS

| | | | |
|---|---|---|---|
| 2021/0266465 A1 | 8/2021 | Wang et al. | |
| 2023/0164438 A1* | 5/2023 | Jang | H04N 23/54 |
| | | | 348/208.11 |
| 2023/0353858 A1* | 11/2023 | Oh | H04N 23/58 |

FOREIGN PATENT DOCUMENTS

| | | |
|---|---|---|
| CN | 112839176 A | 5/2021 |
| EP | 4 102 820 A1 | 12/2022 |
| KR | 10-2017-0005399 A | 1/2017 |
| KR | 10-2021-0073324 A | 6/2021 |
| KR | 10-2021-0100430 A | 8/2021 |

\* cited by examiner

SENSOR SHIFTING MODULE AND CAMERA MODULE INCLUDING THE SAME

CROSS-REFERENCE TO RELATED APPLICATIONS

This application claims the benefit under 35 USC § 119(a) of Korean Patent Application No. 10-2021-0162476 filed on Nov. 23, 2021, in the Korean Intellectual Property Office, the entire disclosure of which is incorporated herein by reference for all purposes.

BACKGROUND

1. Field

The following description relates to a sensor shifting module and a camera module including the same.

2. Description of Related Art

With the development of communications technology, mobile devices, such as, but not limited to, smartphones, have been widely distributed, and accordingly, the demand for increased functionalities related to cameras included in mobile devices has also increased. For example, cameras included in mobile devices may be implemented to provide advanced imaging functions (e.g., an autofocus function, an anti-shake function, and the like) implemented in a typical digital single-lens reflex (DSLR) camera despite a small size thereof.

The optical image stabilization function, that is, an optical image stabilization (OIS) function, may prevent the occurrence of image blurring when a camera is shaken during the exposure time, and the OIS function may be necessary when imaging in low-light environments in which a camera is shaken and the exposure time is long. The OIS may include digital IS (DIS), electronic IS (EIS), and optical IS (OIS). Among these functions, optical IS (OIS) may fundamentally prevent image deterioration caused by shaking by correcting an optical path by moving a lens or image sensor in a direction orthogonal to the optical axis. Since a mechanical actuator is necessary, it may be complicated to be implemented as a device, and although relevant costs are expensive, excellent compensation performance may be obtained.

Since a lens barrel includes an optical system therein, a relatively large amount of force may be necessary to drive the lens barrel. Since an image sensor is relatively lightweight, it may be advantageous to implement an excellent optical image stabilization (OIS) function even with a relatively small force.

A camera implemented in a mobile device may mainly provide a shaking correction function that prevents only the shaking in a direction orthogonal to an optical axis when obtaining an image. Recently, mobile devices have been used to capture videos, and accordingly, it has been desirous to move an image sensor in different varied directions to correct shaking in a more dynamic environment.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a sensor shifting module includes a fixed body; a first movable body movably disposed in the fixed body; a second movable body movably disposed on the first movable body, and configured to be coupled to an image sensor; and a first driver configured to move the first movable body in a direction orthogonal to a first direction with respect to the fixed body; a second driver configured to rotate the first movable body about an axis parallel to the first direction with respect to the fixed body; and a third driver configured to rotate the second movable body about an axis orthogonal to the first direction with respect to the first movable body.

The image sensor may be configured to have an imaging plane oriented in the first direction.

At least one of the first driver and the second driver may include supporting balls disposed between the fixed body and the first movable body.

The third driver may include a tilt guide ball disposed between the first movable body and the second movable body, and configured to provide a tilt center of the second movable body with respect to the first movable body.

The first movable body may be disposed between a lower surface of the second movable body and a bottom surface of the fixed body.

The first driver may include a first actuator, and the first actuator may include a first driving magnet disposed on the second movable body, and a first driving coil disposed on the fixed body to oppose the first driving magnet in a direction perpendicular to the first direction.

The second driver may include a second actuator, and the second actuator comprises a second driving magnet disposed on the second movable body, and a second driving coil disposed on the fixed body to oppose the second driving magnet in a direction perpendicular to the first direction.

The second movable body may include four side surfaces which are formed in a quadrangular shape, and the first driving magnet and the second driving magnet may be disposed on different side surfaces among the four side surfaces.

The second movable body may include a first side surface and a second side surface which form a corner, and the second driving magnet may be disposed on one of the first side surface and the second side surface, and may be disposed adjacent to the corner.

The third driver may include a third actuator, and the third actuator may include a third driving magnet disposed on the second movable body, and a third driving coil disposed on the fixed body to oppose the third driving magnet in the first direction.

The third driving magnet may be one of the first driving magnet and the second driving magnet.

The third driver may include a first magnetic member and a second magnetic member disposed on the first movable body and the second movable body, respectively, and opposing each other in the first direction.

In a general aspect, a camera module includes a lens module comprising at least one lens; and a sensor shifting module, wherein the sensor shifting module includes: a fixed body; a first movable body movably disposed in the fixed body; a second movable body movably disposed on the first movable body and configured to be coupled to an image sensor; supporting balls disposed between the fixed body and the first movable body; and a tilt guide ball disposed between the first movable body and the second movable body and configured to provide a tilt center of the second movable body with respect to the first movable body, wherein the first movable body is configured to move on a plane perpendicular to the first direction while being supported by the supporting balls with respect to the fixed body, and wherein the second movable body is configured to rotate about an axis perpendicular to the first direction while being supported by the tilt guide ball with respect to the first movable body.

The image sensor may be configured to have an imaging plane oriented in a first direction.

The sensor shifting module may further include a first driver configured to move the first movable body in a direction orthogonal to the first direction with respect to the fixed body; a second driver configured to rotate the first movable body about an axis parallel to the first direction with respect to the fixed body; and a third driver configured to rotate the second movable body about an axis orthogonal to the first direction with respect to the first movable body.

The third driver may include a third actuator disposed between the first movable body and the fixed body, and the third actuator comprises a third driving magnet disposed on the second movable body, and a third driving coil disposed on the fixed body to oppose the third driving magnet in the first direction.

One of the first driver and the second driver may include a driving coil and a driving magnet opposing each other in a direction perpendicular to the first direction, and wherein the driving magnet may be the third driving magnet.

In a general aspect, a sensor module includes a first movable body; a second movable body configured to support an image sensor; a first optical image stabilization (OIS) driver configured to move the image sensor in a direction orthogonal to an optical axis; a second OIS driver configured to rotate the image sensor about an axis parallel to the optical axis; and a third OIS driver configured to rotate the image sensor about an axis orthogonal to the optical axis, and configured to move the first movable body relative to a fixed body; wherein the second movable body is movably disposed on the first movable body by a guide ball.

The first OIS driver may include a first driving magnet coupled to the second movable body and a first driving coil coupled to the fixed body, the second OIS driver may include a second driving magnet coupled to the second movable body and a second driving coil coupled to the fixed body, and the third OIS driver may include a third driving magnet coupled to the second movable body and a third driving coil coupled to the fixed body.

The sensor module may include a first position sensor disposed in the first driving coil, and a second position sensor disposed in the second driving coil.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
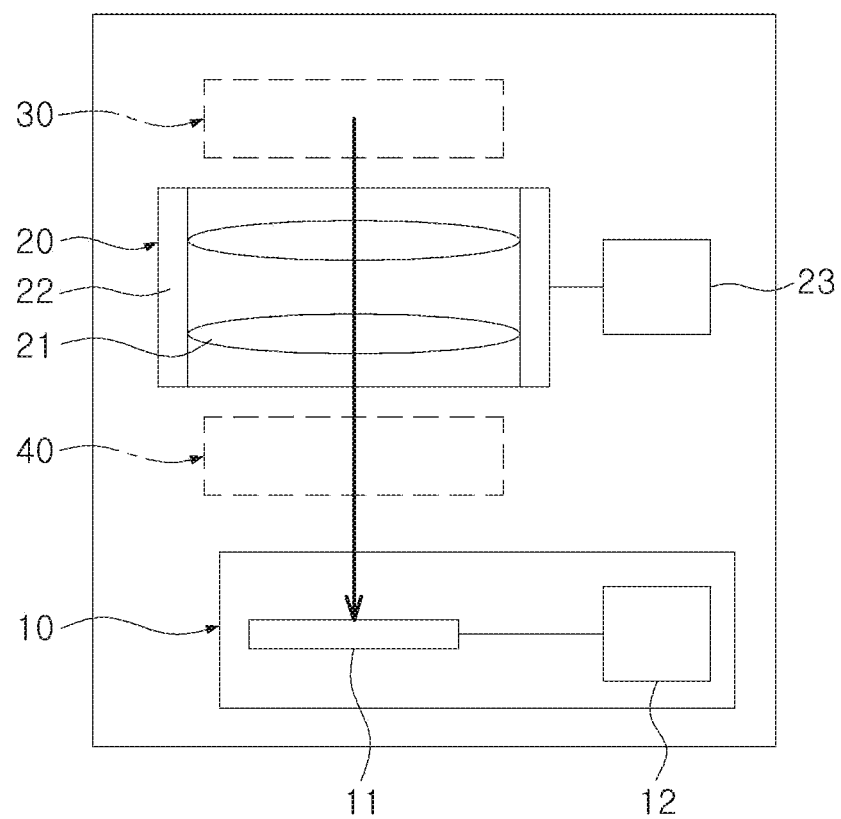
FIG. 1 illustrates example components included in an example camera module, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In the example embodiments, the X-direction, the Y-direction, and the Z-direction may refer to a direction parallel to the X axis, a direction parallel to the Y axis, and a direction parallel to the Z axis, respectively, in the drawings. Additionally, unless otherwise indicated, the X-direction may include both the +X-axis direction and the −X-axis direction, which may also apply to the Y-direction and the Z-direction.

In the example embodiments, two directions (or axes) are parallel to or orthogonal to each other may also include the examples in which the two directions (or axes) are substantially parallel to or substantially side by side to each other. For example, the configuration in which the first axis and the second axis are orthogonal to each other may indicate that the first axis and the second axis may form an angle of 90 degrees or an angle of approximately 90 degrees.

"An example embodiment" does not necessarily indicate the same example embodiments. The particular features, structures, or characteristics may be combined in any suitable manner consistent with the example embodiments.

In the example embodiments, "configured to" may indicate that a component may include a structure necessary to implement a function.

One or more examples relate to a method of implementing optical image stabilization by driving an image sensor 1. Camera Module FIG. 1 illustrates components included in a camera module 1, in accordance with one or more embodiments.

In one or more embodiments, the camera module 1 may include a lens module 20 including at least one lens 21 and a lens barrel 22 accommodating at least one lens 21, and an image sensor 11. Light L may pass through the lens module 20 and may reach an imaging plane of the image sensor 11. The camera module 1 may include an AF driver 23 which may move the lens module 20 in an optical axis direction to adjust a focal length. The AF driver 23 may include, for example, a coil and a magnet that oppose each other. The coil may be fixedly coupled to the lens module 20, the magnet may be coupled to a fixed body such as a housing, and electromagnetic interaction between the coil and the magnet may allow the lens module 20 to move in the optical axis direction.

In an example embodiment, the camera module 1 may provide an optical image stabilization (hereinafter, "OIS") function. The camera module 1 may provide an OIS function by driving the image sensor 11. For example, the camera module 1 may include an OIS driver 12 configured to move the image sensor 11 in a direction orthogonal to the optical axis, or to allow the image sensor 11 to rotate about an axis parallel to the optical axis or to rotate about an axis orthogonal to the optical axis.

In an example embodiment, the camera module 1 may include a sensor shifting module 10. The sensor shifting module 10 may include components necessary to implement the OIS function by driving the image sensor 11. For example, the sensor shifting module 10 may include an image sensor 11 and an OIS driver 12 for driving the image sensor 11. As another example, the sensor shifting module 10 may refer to only the OIS driver 12 excluding the image sensor 11.

In an example embodiment, the camera module 1 may further include an optical element in addition to the lens module 20 and the image sensor 11. In an example embodiment, the camera module 1 may include two or more lens modules. For example, the first optical element 30 and/or the second optical element 40 may be a lens module distinct from the lens module 20.

In an example embodiment, the camera module 1 may include an optical path changing element disposed in front of the lens module 20. For example, the first optical element 30 may be implemented as a prism or a mirror. In another example embodiment, the optical path changing element may be disposed between the image sensor 11 and the lens module 20. For example, the second optical element 40 may be implemented as a prism or a mirror.

Hereinafter, the sensor shifting module 100 described with reference to FIGS. 2A to 7D may be applied to the camera module 1 in FIG. 1.

2. Sensor Shift

Figure 2A:
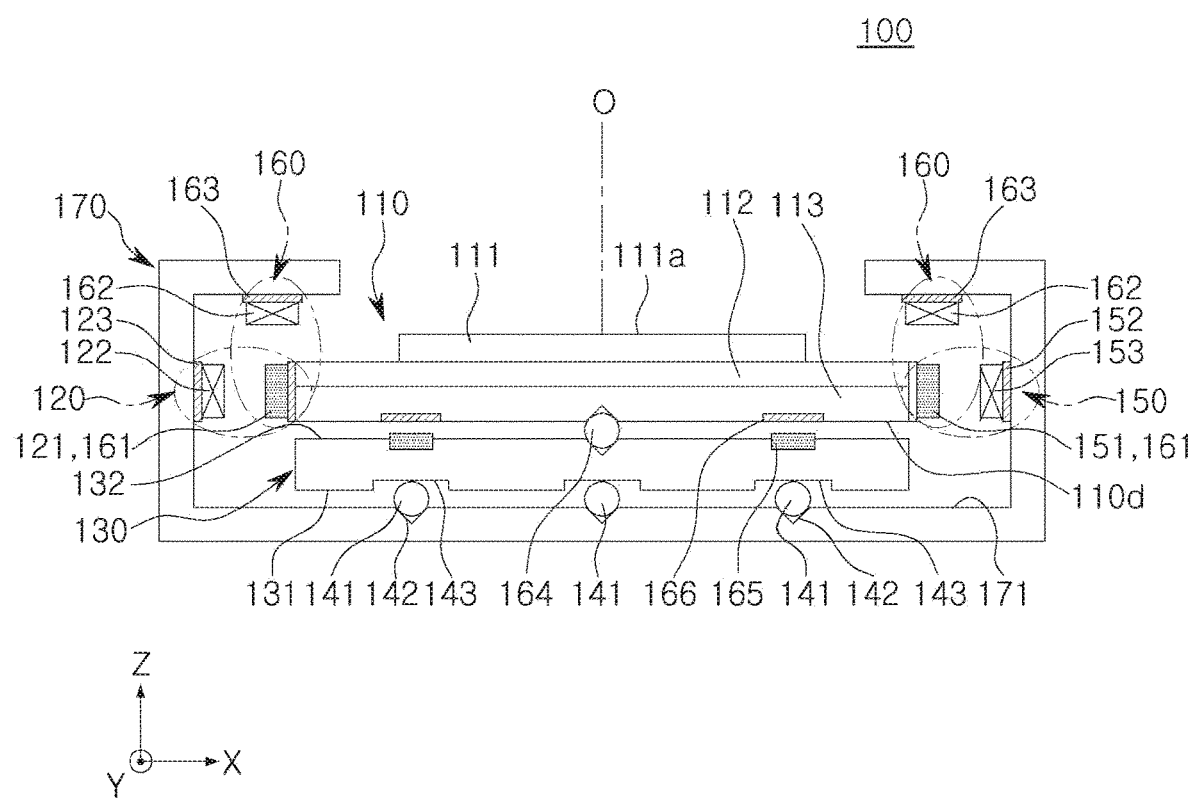
FIG. 2A illustrates an example sensor shifting module, in accordance with one or more embodiments.
Figure 2B:
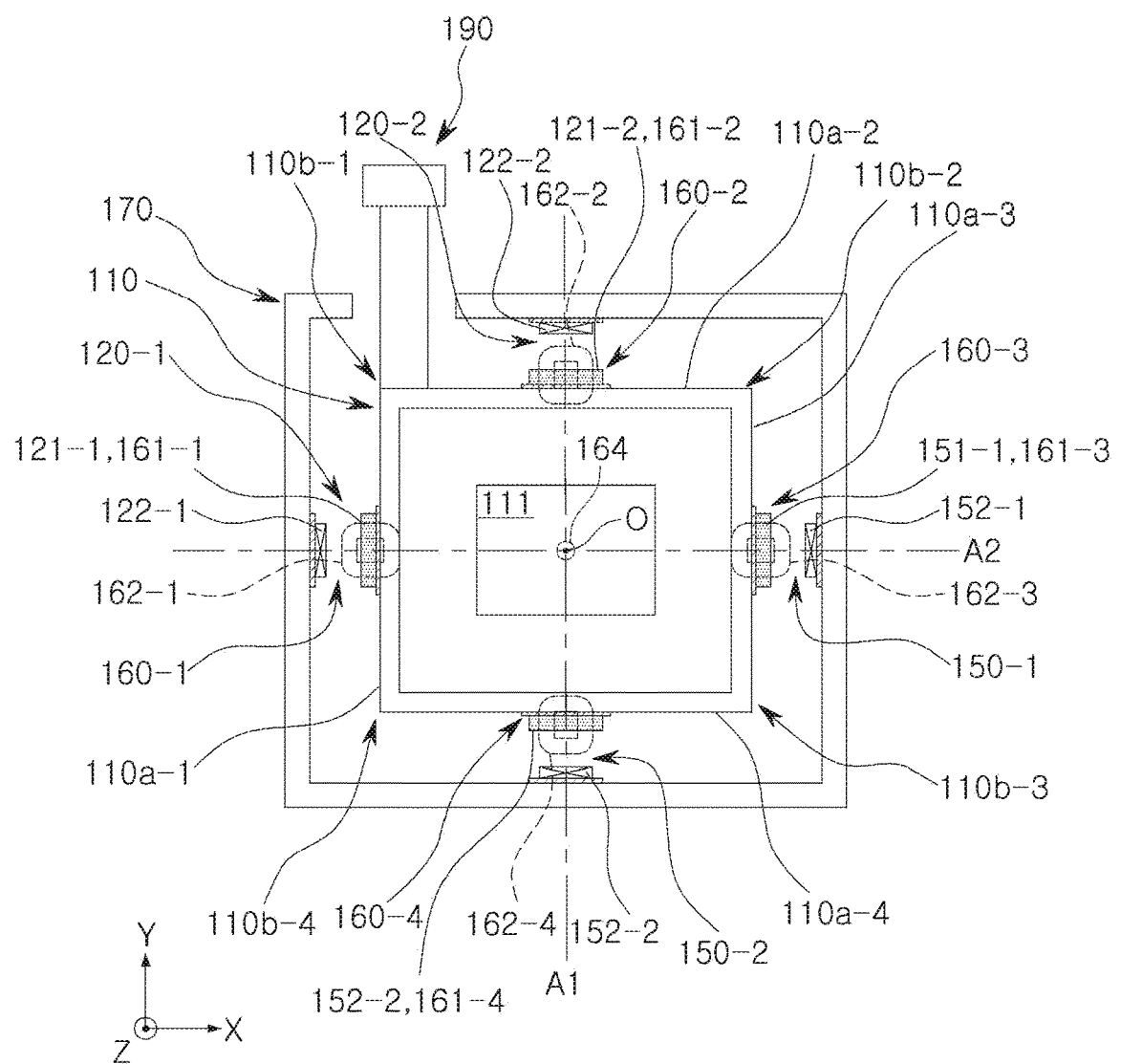
FIG. 2B illustrates example actuators included in an OIS driving unit, in accordance with one or more embodiments.
Figure 2C:
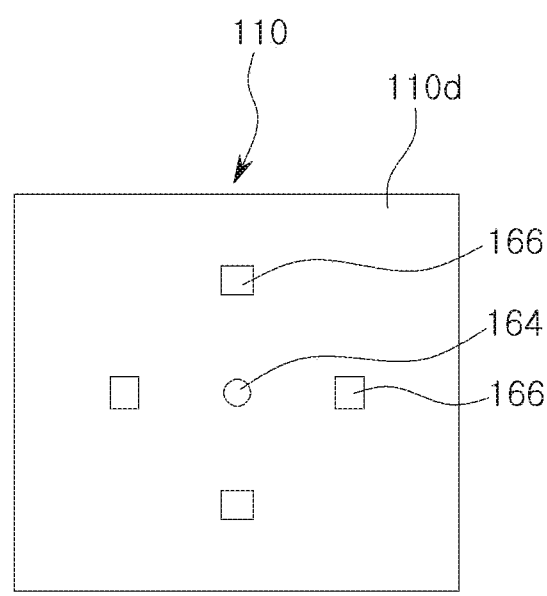
FIG. 2C illustrates a lower surface of the first movable body, in accordance with one or more embodiments.

FIG. 2A illustrates a sensor shifting module 100 according to an example embodiment. FIG. 2B illustrates actuators included in an OIS driving unit according to an example embodiment. FIG. 2C illustrates a lower surface of the first movable body according to an example embodiment.

The sensor shifting module 100 may include an OIS driver. The OIS driver may include at least one of a first OIS driver, a second OIS driver, and a third OIS driver, which will be described later. The first OIS driver may move the image sensor 111 in a direction orthogonal to the optical axis, the second OIS driver may rotate the image sensor 111 about an axis parallel to the optical axis, and the third OIS driver may rotate the image sensor 111 about an axis orthogonal to the optical axis.

The OIS driver 12 of the camera module 1 in FIG. 1 may include at least one of the first OIS driver, the second OIS driver, and the third OIS driver.

2.1. Translation+Rolling OIS 2.1.1. Structure

The sensor shifting module 100 may include a first OIS driver (120) that drives the image sensor 111. In an example embodiment, the sensor shifting module 100 may include a second movable body 110 including an image sensor 111 and a first movable body 130 that supports and moves the second movable body 110. The second movable body 110 may be movably disposed in or on the first movable body 130. The second movable body 110 may be configured to move together with the image sensor 111. For example, the second movable body 110 may include a sensor substrate 112 on which the image sensor 111 is mounted and a sensor holder 113 coupled to the sensor substrate 112. The second movable body 110 may move in a direction orthogonal to the optical axis with respect to the first movable body 130 by the first OIS driver (120).

Referring to FIG. 2B, a signal of the image sensor 111 may be transmitted to another electronic component (e.g., an image signal processor (ISP)) through the sensor substrate 112 and the connector.

In an example embodiment, the sensor shifting module 100 may include a first OIS driver (120) that moves the image sensor 111 in a direction orthogonal to the optical axis O. The second movable body 110 may, through the first OIS driver 120, move in a direction orthogonal to a direction in which the imaging plane 111a of the image sensor 111 is directed with respect to the first movable body 130. In an example embodiment, the first OIS driver 120 may correct the shaking of the camera module 1 or the electronic device on which the image sensor 111 is mounted in a direction orthogonal to the optical axis O. In an example embodiment, the first OIS driver 120 may move the image sensor 111 in a first direction and a second direction orthogonal to the optical axis O. The first direction and the second direction may intersect each other. For example, the first OIS driver 120 may move the second movable body 110 in the X-direction and/or the Y-direction orthogonal to the Z axis, thereby correcting the shaking in the X-direction and/or the Y-direction.

In the example embodiment, the direction in which the imaging plane 111a of the image sensor 111 is directed may be referred to as an optical axis O direction. That is, the second movable body 110 may move in a direction orthogonal to the optical axis O with respect to the first movable body 130. In the drawings, the optical axis O may be parallel to the Z axis, and accordingly, the Z-direction may refer to a direction parallel to the optical axis O. Additionally, the X-direction or the Y-direction may refer to a direction orthogonal to the optical axis O. For example, in the example embodiment, the configuration in which the second movable body 110 moves in the X-direction may indicate that the second movable body 110 may move in a direction orthogonal to the optical axis O. For another example, the configuration in which the driving yoke 121 and the driving coil 122 oppose each other in the X-direction may indicate that the driving yoke 121 and the driving coil 122 oppose each other in a direction orthogonal to the optical axis O. Additionally, the X-direction or the Y-direction may be an example of two directions orthogonal to the optical axis and intersecting each other, and in the example embodiment, the X-direction and the Y-direction may be configured as two directions orthogonal to the optical axis O and intersecting each other.

In an example embodiment, the sensor shifting module 100 may include a second OIS driver 150 that rotates the image sensor 111 about an axis parallel to the optical axis O. The second movable body 110 may, through the second OIS driver 150, rotate with respect to the fixed body 170 about an axis parallel to the direction in which the imaging plane 111a of the image sensor 111 is directed. In an example embodiment, the second OIS driver 150 may correct rotation of the camera module 1 or the electronic device on which the image sensor 111 is mounted about an axis parallel to the optical axis O.

2.1.2 First Actuator (Translation)

Referring to FIGS. 2A and 2B, in an example embodiment, the first OIS driver may include a first actuator 120 disposed between the fixed body 170 and the second movable body 110. In an example embodiment, the first actuator 120 may include a first driving magnet 121 coupled to the second movable body 110, and a first driving coil 122 coupled to the fixed body 170. For example, referring to FIG. 2A, in an example embodiment, the first driving coil 122 may be coupled to the internal surface of the fixed body 170 and the first driving magnet 121 may be coupled to one side surface of the second movable body 110. However, this is a non-limiting example, and in an example, the first driving coil 122 may be coupled to one side surface of the second movable body 110, and the first driving magnet 121 may be coupled to the internal surface of the fixed body 170. The first driving magnet 121 and the first driving coil 122 may oppose each other in a direction (e.g., the X-direction or the Y-direction) orthogonal to the optical axis O. Electromagnetic interaction between the first driving magnet 121 and the first driving coil 122 may allow the second movable body 110 to move in a direction orthogonal to the optical axis O with respect to the first movable body 130.

The first OIS driver 120 may include a plurality of first actuators 120, and each of the first actuators 120 may include a first driving magnet 121 and a first driving coil 122. For example, the first OIS driver 120 may include a 1-1 actuator 120-1 disposed on the first side surface 110a-1 of the second movable body 110 and a 1-2 actuator 120-2 disposed on the second side surfaces 110a-2 of the second movable body 110. Referring to FIG. 2B, a 1-1 actuator 120-1 may include a 1-1 driving magnet 121-1 and a 1-1 driving coil 122-1. The 1-2 actuator 120-2 may include a 1-2 driving magnet 121-2 and a 1-2 driving coil 122-2.

In an example embodiment, the first OIS driver may further include a yoke 123 disposed on one side of the first driving magnet 121 and/or the first driving coil 122. The yoke 123 attached to one side of the first driving coil 122 may allow the magnetic field created by the first driving coil 122 to be concentrated in a direction toward the first driving magnet 121. Since the yoke 123 is disposed on one side of the first driving coil 122, the magnetic field created by the first driving coil 122 may be prevented from affecting the other electronic components or the effect of the magnetic field on the other electronic components may be reduced. The yoke 123 attached to one side of the first driving magnet 121 may allow the magnetic field created by the first driving magnet 121 to be concentrated in a direction toward the first driving coil 122.

In the example embodiments, the first driving coil 122 and the first driving magnet 121 may be coupled to the fixed body 170 and the second movable body 110, respectively, but an example embodiment thereof is not limited thereto. In another example embodiment, the first driving coil 122 and the first driving magnet 121 may be coupled to the second movable body 110 and the fixed body 170, respectively.

2.1.3 Second Actuator (Rolling)

Referring to FIGS. 2A and 2B, in an example embodiment, the second OIS driver may include a second actuator 150 disposed between the fixed body 170 and the second movable body 110. In an example embodiment, the second actuator 150 may include a second driving magnet 151 coupled to the second movable body 110, and a second driving coil 152 coupled to the fixed body 170. However, this is only an example, and in an example, the second driving magnet 151 may be coupled to the fixed body 170, and the second driving coil 152 may be coupled to second moveable body 110.

Referring to FIG. 2A, in an example embodiment, the second driving coil 152 and the second driving magnet 151 may be coupled to the internal surface of the fixed body 170 and one side surface of the second movable body 110, respectively. The second driving magnet 151 and the second driving coil 152 may oppose each other in a direction orthogonal to the optical axis O. Electromagnetic interaction between the second driving magnet 151 and the second driving coil 152 may rotate the second movable body 110 about an axis parallel to the optical axis O with respect to the first movable body 130.

The second OIS driver 150 may include a plurality of second actuators 150, and each of the second actuators 150 may include a second driving magnet 151 and a second driving coil 152. For example, the second OIS driver 150 may include a 2-1 actuator 150-1 disposed on the third side surface 110-3 of the second movable body 110 and a 2-2 actuator 150-2 disposed on the fourth side surface 110-4 of the second movable body 110. Referring to FIG. 2B, the 2-1 actuator 150-1 may include a 2-1 driving magnet 151-1 and a 2-1 driving coil 152-1. The 2-2 actuator 150-2 may include a 2-2 driving magnet 151-2 and a 2-2 driving coil 152-2.

In an example embodiment, the second OIS driver 150 may further include a yoke 153 disposed on one side of the second driving magnet 151 and/or the second driving coil 152. The yoke 153 attached to one side of the second driving coil 152 may allow the magnetic field created by the second driving coil 152 to be concentrated in a direction toward the second driving magnet 151. Since the yoke 153 is disposed on one side of the second driving coil 152, the magnetic field created by the second driving coil 152 may be prevented from affecting the other electronic components or the effect of the magnetic field on the other electronic components may be reduced. The yoke 153 attached to one side of the second driving magnet 151 may allow the magnetic field created by the second driving magnet 151 to be concentrated in a direction toward the second driving coil 152.

In the example embodiment, the second driving coil 152 and the second driving magnet 151 may be coupled to the fixed body 170 and the second movable body 110, respectively. However, the examples are not limited thereto, and in another example embodiment, the second driving coil 152 and the second driving magnet 151 may be coupled to the second movable body 110 and the fixed body 170, respectively.

2.1.4. Ball Guide/Support

The first movable body 130 (or the second movable body 110) may move on a plane perpendicular to the optical axis O based on operations performed by the first OIS driver 120 or the second OIS driver 150. The movement of the first movable body 130 may be supported by the supporting balls 141. The supporting balls 141 may be included in a portion of the first OIS driver 120 or the second OIS driver 150.

The second movable body 110 may rotate based on a movement in an axis perpendicular to the optical axis O based on an operation by the third OIS driver. The movement of the second movable body 110 may be supported by the tilt guide ball 164.

The first movable body 130 may be disposed between the second movable body 110 and the fixed body 170. For example, the first movable body 130 may be disposed between the lower surface 110d of the second movable body 110 and the bottom surface 171 of the fixed body 170. The first movable body 130 may guide or support the movement of the second movable body 110. The second movable body 110 may be rotated and supported by the tilt guide ball 164 seated on the first movable body 130, and between the second movable body 110 and the first movable body 130. The first movable body 130 may be disposed on the bottom surface 171 of the fixed body 170 and may move on a plane perpendicular to the optical axis O, such that the second movable body 110 may move on a plane perpendicular to the optical axis O with respect to the fixed body 170.

Figure 3:
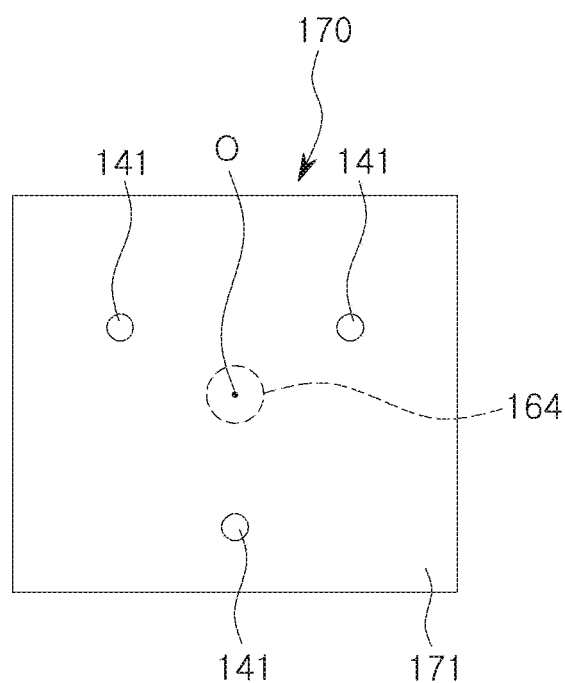
FIG. 3 illustrates arrangement of supporting balls, in accordance with one or more embodiments.

FIG. 3 illustrates an example arrangement of the supporting balls 141, in accordance with one or more embodiments.

Referring to FIG. 3, the supporting balls 141 may be disposed between the lower surface 131 of the first movable body 130, and the bottom surface 171 of the fixed body 170. For example, referring to FIG. 3, three supporting balls 141 may be disposed on the bottom surface 171 of the fixed body 170. The second movable body 110 and the fixed body 170 may include grooves that partially accommodate the supporting balls 141. For example, a first groove 142 and a second groove 143 may be disposed in the fixed body 170 and the first movable body 130, respectively. Although three supporting balls 141 are illustrated, this is only an example, and a number of supporting balls 141 that are less than or greater than three may be included.

At least one of the first groove 142 or the second groove 143 may be configured such that the supporting ball 141 may move in a predetermined range in a direction perpendicular to the optical axis O with respect to the fixed body 170 or the first movable body 130. For example, the second groove 143 may be formed to be in contact with the supporting ball 141 at at least one point, and the supporting ball 141 may roll or slide within the second groove 143 in a predetermined range. Accordingly, the first movable body 130 or the second movable body 110 may move on a plane perpendicular to the optical axis O with respect to the fixed body 170 by the first OIS driver 120 or the second OIS driver 150.

In an example embodiment, the first OIS driver 120 may include a first position sensor which may measure how much the second movable body 110 moves in a direction orthogonal to the optical axis O. The first position sensor may be configured as a Hall sensor or a magnetoresistive sensor. In an example embodiment, the first position sensor may be disposed in the first driving coil 122 to oppose the first driving magnet 121. The internal portion of the coil may refer to an empty space corresponding to the winding center of the coil.

In another example embodiment, the first OIS driver 120 may include a sensing magnet distinct from the first driving magnet 121, and the first position sensor may be disposed to oppose the sensing magnet. For example, the first position sensor and the sensing magnet may be disposed to oppose the fixed body 170 or the first movable body 130 in the optical axis direction (in the Z-direction).

In an example embodiment, the first OIS driver 120 may include a second position sensor which may measure how much the second movable body 110 rotates along an axis parallel to the optical axis O. The second position sensor may be configured as a Hall sensor or a magnetoresistance sensor. In an example embodiment, the second position sensor may be disposed in the second driving coil 152 to oppose the second driving magnet 151.

In another embodiment, the second OIS driver 150 may include a sensing magnet distinct from the second driving magnet 151, and the second position sensor may be disposed to oppose the sensing magnet. For example, the second position sensor and the sensing magnet may be disposed to oppose the fixed body 170 or the first movable body 130 in the optical axis direction (in the Z-direction).

The second position sensor may be the same component as the first position sensor. That is, one position sensor may be used to measure both translational movement (movement by the first OIS driver) and rotational movement (movement by the second OIS driver) of the second movable body.

2.1.4. Arrangement of Actuator

Figure 4A:
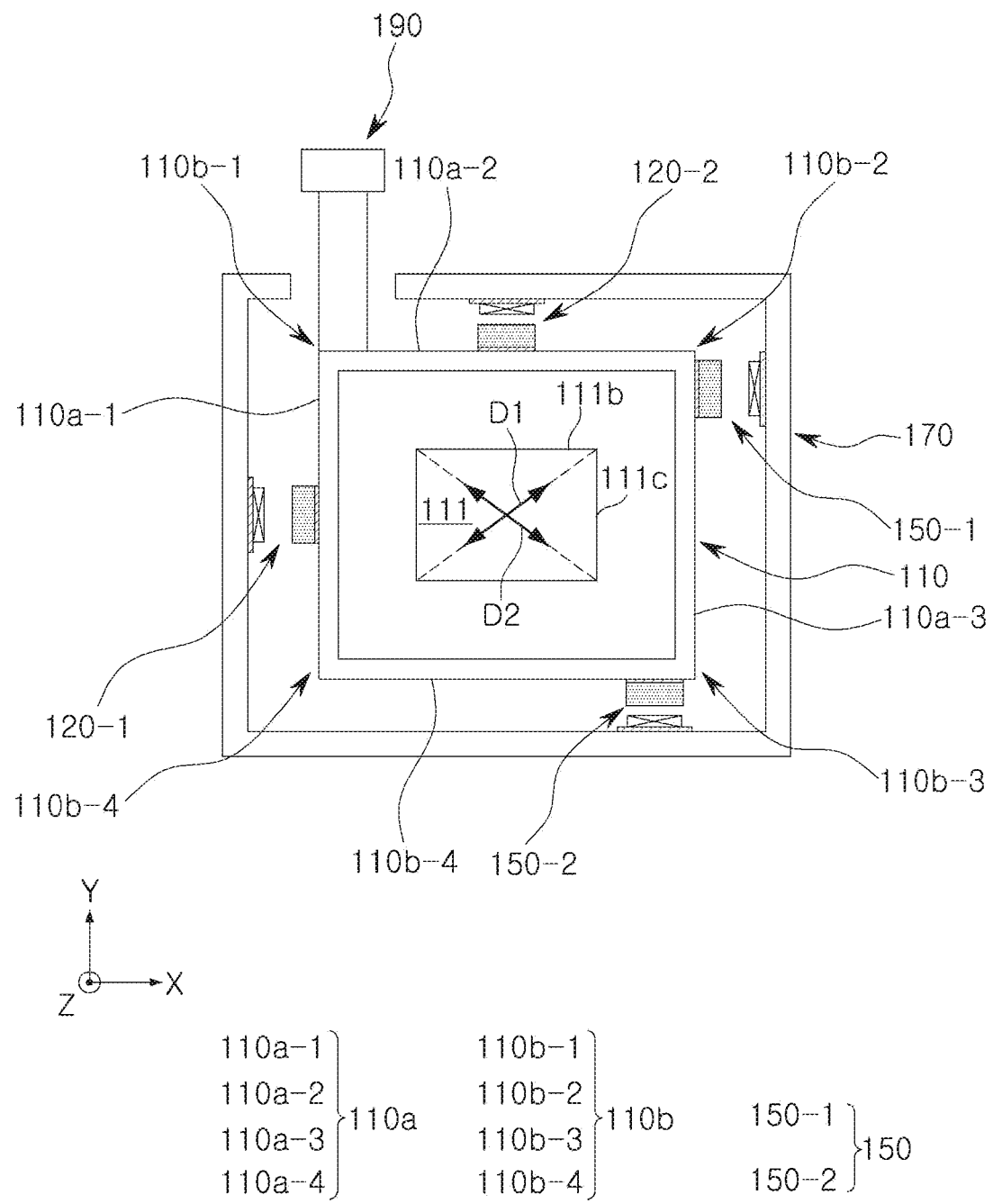
FIGS. 4A and 4B illustrate arrangements of a first OIS driver and a second OIS driver, in accordance with one or more embodiments.
Figure 4B:
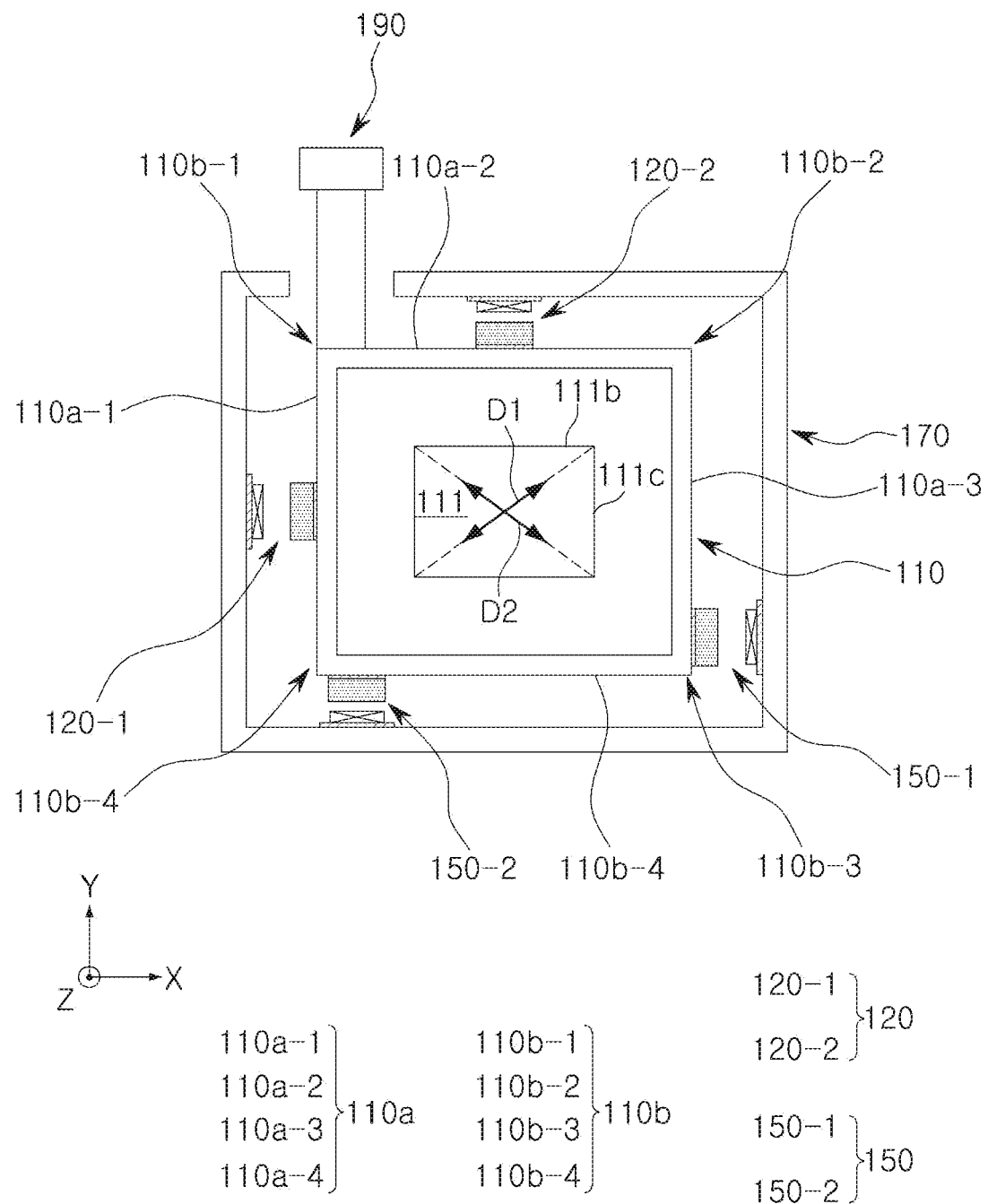

FIGS. 4A and 4B illustrate an arrangement of a first OIS driver 120 and a second OIS driver 150, in accordance with one or more embodiments.

Referring to FIG. 2B, FIG. 4A, or FIG. 4B, the second movable body 110 may include four side surfaces 110*a*-1, 110*a*-2, 110*a*-3, and 110*a*-4 that form a quadrangular shape, and two side surfaces adjacent to each other among the four side surfaces 110*a*-1, 110*a*-2, 110*a*-3, and 110*a*-4 may form a corner.

The second movable body 110 may include a first side surface 110*a*-1, a second side surface 110*a*-2, a third side surface 110*a*-3, and a fourth side surface 110*a*-4 arranged in a clockwise direction. A first corner 110*b*-1 may be formed at the boundary between the first side surface 110*a*-1 and the second side surface 110*a*-2, a second corner 110*b*-2 may be formed at the boundary between the second side surface 110*a*-2 and the third side surface 110*a*-3, a third corner 110*b*-2 may be formed between the third side surface 110*a*-3 and the fourth side surface 110*a*-4, and a fourth corner 110*b*-4 may be formed between the fourth side surface 110*a*-4 and the first side surface 110*a*-1. The side surface 110*a* of the first movable body 110 may be a side surface of the sensor holder 113.

In an example embodiment, the four side surfaces 110*a*-1, 110*a*-2, 110*a*-3, 110*a*-4 may be parallel to the horizontal side 111*b* or the vertical side 111*c* of the image sensor 111, and the four corners 110*b* may be disposed in the diagonal directions D1 and D2 of the image sensor.

The first actuator (or first OIS driver) 120 and the second actuator (or second OIS driver) 150 may be disposed on side surfaces distinct from each other among the four side surfaces 110*a*-1, 110*a*-2, 110*a*-3, and 110*a*-4. For example, the 1-1 actuator 120-1, the 1-2 actuator 120-2, the 2-1 actuator 150-1, and the 2-2 actuator 150-2 may be disposed on the first side surface 110*a*-1, the second side surface 110*a*-2, the third side surface 110*a*-3, and the fourth side surface 110*a*-4, respectively.

Referring to FIGS. 4A and 4B, the second actuator 150 included in the second OIS driver may be disposed adjacent to the corner 110*b* of the second movable body 110. Since the second actuator 150 is disposed adjacent to the corner 110*b*, the second movable body 110 may rotate efficiently.

Referring to FIG. 4A, the 1-1 actuator 120-1 and the 1-2 actuator 120-2 included in the first OIS driver may be disposed in the center of a first side surface 110-1 and a second side surface 110-2. The 2-1 actuator 150-1 and the 2-2 actuator 150-2 included in the second OIS driver may be disposed on the third side surface 110-3 and the fourth side surface 110-4, respectively. The 2-1 actuator 150-1 and the 2-2 actuator 150-2 may be disposed adjacent to the second corner 110*b*-2 and the third corner 110*b*-3, respectively.

Referring to FIG. 4B, the 2-1 actuator 150-1 and the 2-2 actuator 150-2 included in the second OIS driver may be disposed on a third side surface 110-3 and a fourth side surface 110-4, respectively. The 2-1 actuator 150-1 and the 2-2 actuator 150-2 may be disposed adjacent to the third corner 110*b*-3 and the fourth corner 110*b*-4, respectively.

2.2. Tilting OIS 2.2.1. Structure

Referring to FIG. 2A, the sensor shifting module 100 may include a third OIS driver 160. The sensor shifting module 100 may include a third OIS driver that moves the first movable body 130 relative to the fixed body 170. The third OIS driver 160 may rotate the first movable body 130 about an axis (e.g., the first axis A1 or the second axis A2 in FIG. 2B) orthogonal to the optical axis O with respect to the fixed body 170. The shaking correction may be implemented by translating the image sensor 111 in a direction orthogonal to the optical axis O, but since the size of the mobile camera has a relatively small size, the range of translation movement may be relatively small, and accordingly, when the degree of shaking is relatively large, the amount of correction may not reach the shaking. The third OIS driver may correct the shaking by tilting the image sensor 111, and may provide a shaking correction function of excellent quality even for relatively large shaking.

The first movable body 130 may be movably disposed in the fixed body 170. The first movable body 130 may move with respect to the fixed body 170 based on an operation by the third OIS driver. The image sensor 111 may be coupled to the first movable body 130. The image sensor 111 may be movably coupled to the first movable body 130. For example, the image sensor 111 may be coupled to the second movable body 110, and the second movable body 110 may be movably coupled to the first movable body 130. The second movable body 110 may move relative to the first movable body 130 based on an operation by the first OIS driver or the second OIS driver.

2.2.2. Third Actuator (Tilting)

Referring to FIGS. 2A and 2B, the third OIS driver may include a third actuator 160 disposed between the fixed body 170 and the first movable body 130. The third actuator 160 may include a third driving magnet 161 coupled to the first movable body 130 or the second movable body 110 and a third driving coil 162 coupled to the fixed body 170 to oppose the third driving magnet 161.

In an example embodiment, the third actuator 160 may further include a yoke 163. The yoke 163 may be disposed on one side of the third driving magnet 161 and/or the third driving coil 162.

In an example embodiment, the third driving magnet 161 may be the first driving magnet 121 of the first OIS driver or the second driving magnet 151 of the second OIS driver. That is, the first driving magnet 121 or the second driving magnet 151 may be included in a portion of the third OIS driver. For example, at least one of the 1-1 driving magnet 121-1, the 1-2 driving magnet 121-2, the 2-1 driving magnet 151-1, or the 2-2 driving magnet 151-2 may be implemented as the third driving magnet 161. Accordingly, a component described as the third driving magnet 161 in the example embodiment may be understood as the first driving magnet 121 or the second driving magnet 151.

The third OIS driver may include a plurality of third actuators 160, and each of the third actuators 160 may include a third driving magnet 161 and a third driving coil 162. For example, the third OIS driver may include four third actuators 160 corresponding to the 1-1 actuator 120-1, the 1-2 actuator 120-2, the 2-1 actuator 150-1, and the 2-2 actuator 150-2, respectively.

In an example embodiment, the third actuator 160 may include a 3-1 actuator 160-1, a 3-2 actuator 160-2, a 3-3 actuator 160-3, and a 3-4 actuator 160-4.

Referring to FIG. 2B, a 3-1 actuator 160-1 may include a 3-1 driving magnet 161-1 and a 3-1 driving coil 162-1. The 3-2 actuator 160-2 may include a 3-2 driving magnet 161-2 and a 3-2 driving coil 162-2. The 3-3 actuator 160-3 may include a 3-3 driving magnet 161-3 and a 3-3 driving coil 162-3. The 3-4 actuator 160-4 may include a 3-4 driving magnet 161-4 and a 3-4 driving coil 162-4.

The 1-1 driving magnet 121-1, the 1-2 driving magnet 121-2, the 2-1 driving magnet 151-1, and the 2-2 driving magnet 151-2 may be implemented as driving magnets 161-1, 161-2, 161-3, and 161-4 of the 3-1 actuator 160-1, the 3-2 actuator 160-2, the 3-3 actuator 160-3, and the 3-4 actuator 160-4, respectively. The 3-1 driving coil 162-1, the 3-2 driving coil 162-2, the 3-3 driving coil 162-3, and the 3-4 driving coil 162-4 may be disposed to oppose the 1-1 driving magnet 121-1, the 1-2 driving magnet 121-2, the 2-1 driving magnet 151-1, and the 2-2 driving magnet 151-2, respectively.

The third OIS driver may rotate the first movable body 130 about the first axis A1 and the second axis A2. The first axis A1 and the second axis A2 may be orthogonal to the optical axis O, and may intersect each other. For example, the first axis A1 may be parallel to the Y axis, and the second axis A2 may be parallel to the X axis.

The 3-1 actuator 160-1 or the 3-3 actuator 160-3 may provide a moment in the first axis A1 direction to the first movable body 130. When a current is applied to the 3-1 driving coil 162-1, attractive force or repulsive force may be created between the 3-1 driving coil 162-1 and the 1-1 driving magnet 121-1, such that the first movable body 130 may be tilted relative to the fixed body 170 with respect to the first axis A1 orthogonal to the optical axis. When a current is applied to the 3-3 driving coil 162-3, an attractive force or a repulsive force may be created between the 3-3 driving coil 162-3 and the 2-1 driving magnet 151-1, such that the first movable body 130 may be tilted relative to the fixed body 170 with respect to the first axis A1 orthogonal to the optical axis.

The 3-2 actuator 160-2 and the 3-4 actuator 160-4 may provide a moment to the first movable body 130 in the second axis A2 direction. When a current is applied to the 3-2 driving coil 162-2, an attractive force or a repulsive force may be created between the 3-2 driving coil 162-2 and the 1-2 driving magnet 121-2, such that the first movable body 130 may be tilted relative to the fixed body 170 with respect to the second axis A2 orthogonal to the optical axis. When a current is applied to the 3-4 driving coil 162-4, attractive force or repulsive force may be created between the 3-4 driving coil 162-4 and the 2-2 driving magnet 151-2, such that the first movable body 130 may be tilted relative to the fixed body 170 with respect to the second axis A2 orthogonal to the optical axis.

In an example embodiment, a portion of the 3-1 driving coil 162-1, the 3-2 driving coil 162-2, the 3-3 driving coil 162-3, or the 3-4 driving coil 162-4 may not be provided. In an example embodiment, one of the 3-1 actuator 160-1 and the 3-3 actuator 160-3 providing the moment in the Y-direction may not be provided. In an example embodiment, one of the 3-2 actuator 160-2 and the 3-4 actuator 160-4 providing the moment in the X-direction may not be provided. For example, the third OIS driver may include only the 3-1 actuator 160-1 and the 3-2 actuator 160-2. As another example, the third OIS driver may include only the 3-3 actuator 160-3 and the 3-4 actuator 160-4.

2.2.3. Ball Guide

In an example embodiment, the third OIS driver may include a tilt guide ball 164 disposed between the second movable body 110 and the first movable body 130. The tilt guide ball 164 may provide a tilt center for the first movable body 130 or the second movable body 110. For example, the second movable body 110 may be tilted around the tilt guide ball 164. Referring to FIG. 2A, the lower surface 110*d* of the second movable body 110 and the upper surface 132 of the first movable body 130 may face each other in the optical axis O direction, and a groove to partially accommodate the tilt guide ball 164, may be formed in the lower surface 110*d* of the second movable body 110 and the upper surface 132 of the first movable body 130, respectively.

2.2.4. Pulling

FIG. 2C illustrates a lower surface of the first movable body, in accordance with one or more embodiments.

Referring to FIGS. 2A and 2C, in an example embodiment, the third OIS driver may include a pulling device disposed on the second movable body 110 and the first movable body 130, respectively, and opposing each other in a direction parallel to the optical axis O. The pulling device may include a first magnetic member 165 and a second magnetic member 166. A magnetic attraction may be created between the first magnetic member 165 and the second magnetic member 166, such that the first movable body 130 may be pulled to the bottom surface of the fixed body 170, or such that the second movable body 110 may be pulled to the bottom surface of the fixed body 170. Accordingly, the tilt guide ball 164 may maintain to be in contact with the first movable body 130 and the fixed body 170, such that the first movable body 130 may be smoothly tilted with respect to the fixed body 170.

In an example, one of the first magnetic member 165 or the second magnetic member 166 may be a magnet, and the other may be a magnet or a yoke. For example, the first magnetic member 165 may be a magnet and the second magnetic member 166 may be a yoke.

Referring to FIG. 2C, a plurality of second magnetic members 166 may be arranged around the tilt guide ball 164. A plurality of first magnetic members 165 corresponding to the plurality of second magnetic members 166 may be arranged on the upper surface 132 of the first movable body 130.

In an example embodiment, the third OIS driver may include a third position sensor configured to measure the amount of tilting of the first movable body 130. The third position sensor may be configured as a Hall sensor or a magnetoresistance sensor.

In an example embodiment, the third position sensor may be disposed in the third driving coil 162 and may oppose the first driving magnet 121 or the second driving magnet 151.

In an example embodiment, the third OIS driver may include a sensing magnet that opposes the third position sensor. In an example embodiment, one of the first magnetic member 165 and the second magnetic member 166 may be a magnet and the other may be a yoke, and the magnetic member which is a magnet may function as a sensing magnet. In a non-limited example, referring to FIG. 2A, the first magnetic member 165 may be a magnet, the second magnetic member 166 may be a yoke, the first magnetic member 165 may include a through portion therein, and a third position sensor may be disposed in the through portion.

2.3. Movement 2.3.1. Translation Movement

FIGS. 5A to 5D illustrate the movement of the second movable body 110 based on an operation of a first OIS driver.

Figure 5A:
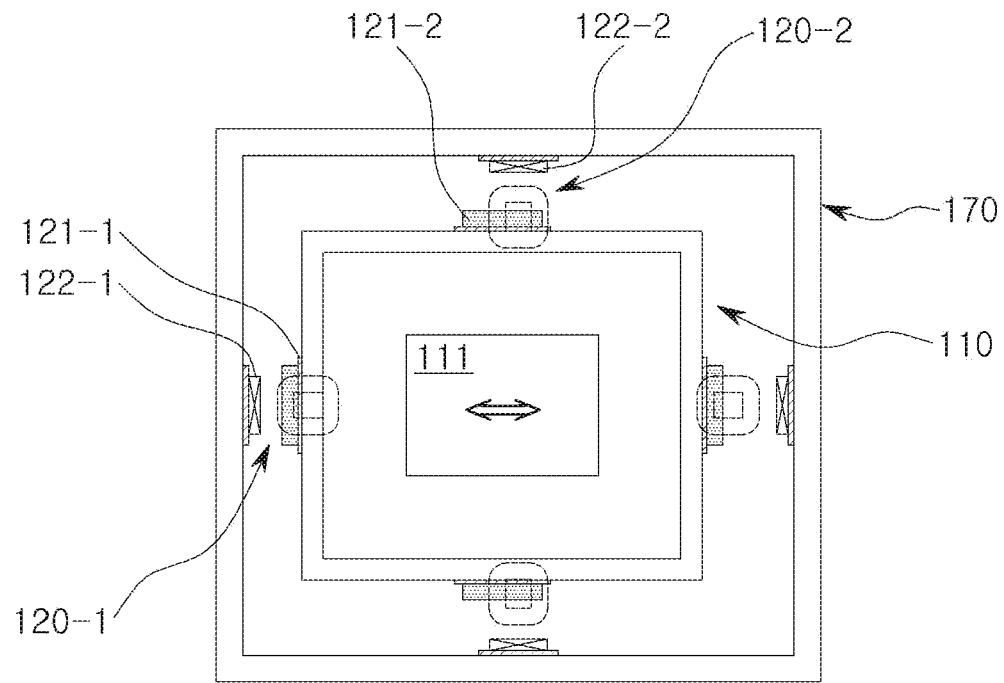
FIGS. 5A and 5B illustrate movement of a second movable body due to a first OIS driver, in accordance with one or more embodiments.

Referring to FIG. 5A, the 1-1 actuator 120-1 may move the second movable body 110 in the X-direction with respect to the fixed body 170. When a current is applied to the 1-1 driving coil 122-1, attractive force or repulsive force in the X-direction may be created between the 1-1 driving coil 122-1 and the 1-1 driving magnet 121-1 such that the second movable body 110 (or the image sensor 111) may move in the −X-direction or the +X-direction.

Figure 5B:
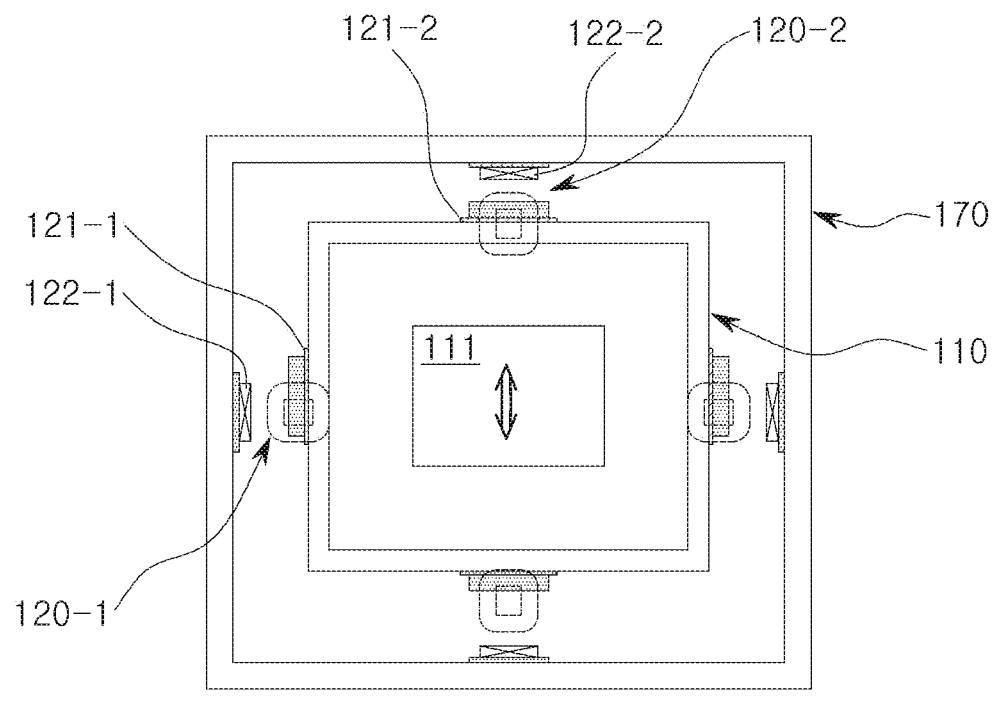

Referring to FIG. 5B, the first and second actuators 120-2 may move the second movable body 110 in the Y-direction with respect to the fixed body 170. When a current is applied to the 1-2 driving coil 122-2, attractive force or repulsive force in the Y-direction may be created between the 1-2 driving coil 122-2 and the 1-2 driving magnet 121-2, such that the second movable body 110 (or the image sensor 111) may move in the −Y-direction or the +Y-direction.

2.3.2. Rolling Movement

Figure 6A:
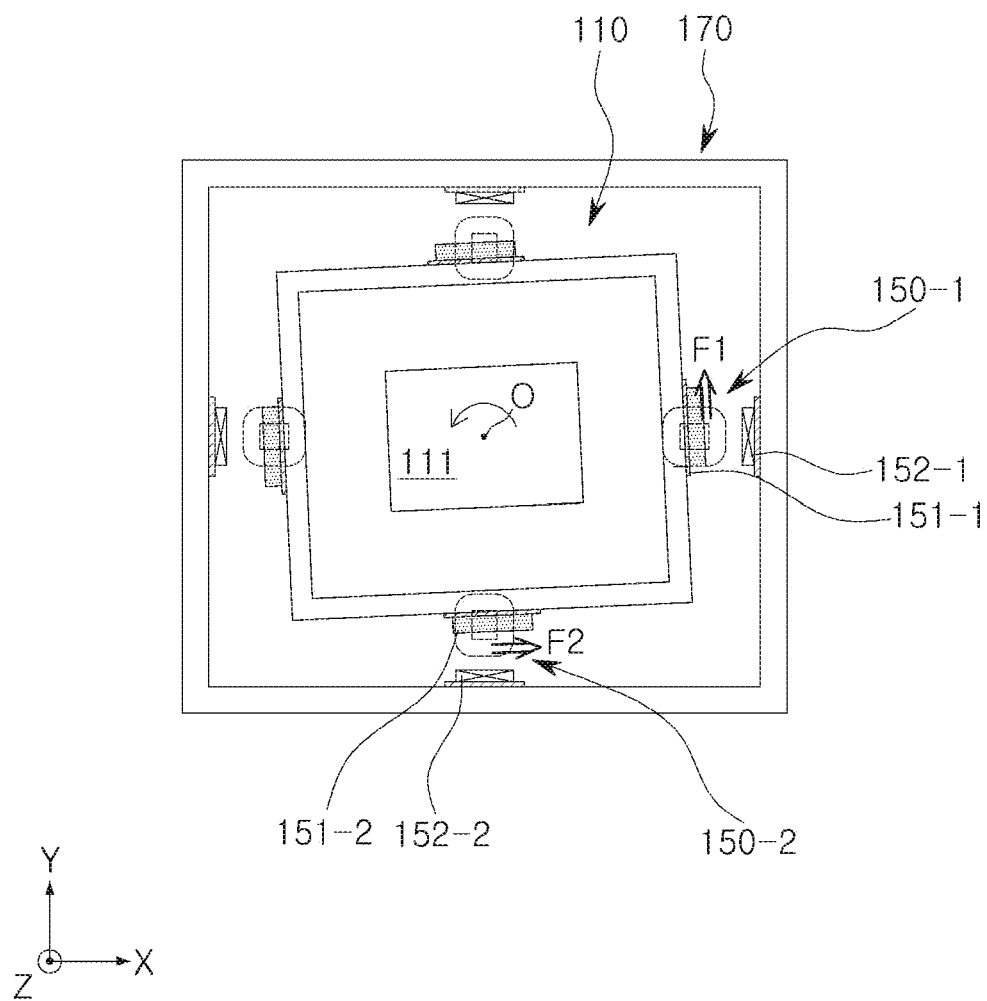
FIGS. 6A and 6B illustrate rolling of a second movable body due to a second OIS driver, in accordance with one or more embodiments.
Figure 6B:
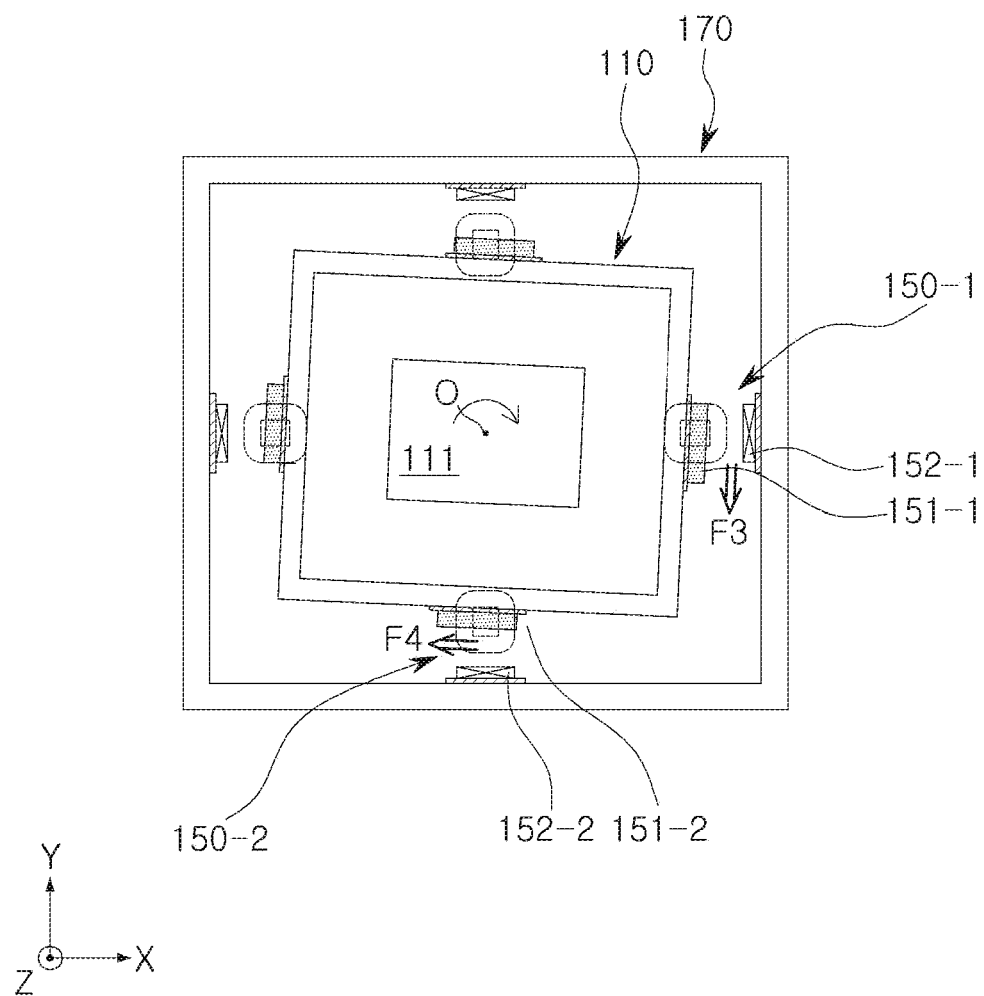

FIGS. 6A and 6B illustrate the rolling of the second movable body 110.

Referring to FIG. 6A, the 2-1 actuator 150-1 and the 2-2 actuator 150-2 may rotate the second movable body 110 in a counterclockwise direction with respect to the first movable body 130. The 2-1 actuator 150-1 and the 2-2 actuator 150-2 may provide a moment in a counterclockwise direction to the second movable body 110. For example, a Lorentz force may be created between the 2-1 driving magnet 151-1 and the 2-1 driving coil 152-1, and accordingly, a force F1 may act on the 2-1 driving magnet 151-1. A Lorentz force may be created between the 2-2 driving magnet 151-2 and the 2-2 driving coil 152-2, and accordingly, a force F2 may act on the 2-1 driving magnet 151-1. F1 and F2 may rotate the second movable body 110 in a counterclockwise direction.

Referring to FIG. 6A, the 2-1 actuator 150-1 and the 2-2 actuator 150-2 may rotate the second movable body 110 in a clockwise direction with respect to the first movable body 130. The 2-1 actuator 150-1 and the 2-2 actuator 150-2 may provide a moment in a clockwise direction to the second movable body 110. For example, a Lorentz force may be created between the 2-1 driving magnet 151-1 and the 2-1 driving coil 152-1, and accordingly, a force F3 may act on the 2-1 driving magnet 151-1. A Lorentz force may be created between the 2-2 driving magnet 151-2 and the 2-2 driving coil 152-2, and accordingly, a force F4 may act on the 2-1 driving magnet 151-1. F3 and F4 may rotate the second movable body 110 in a clockwise direction.

2.3.3. Tilting Movement

Figure 7A:
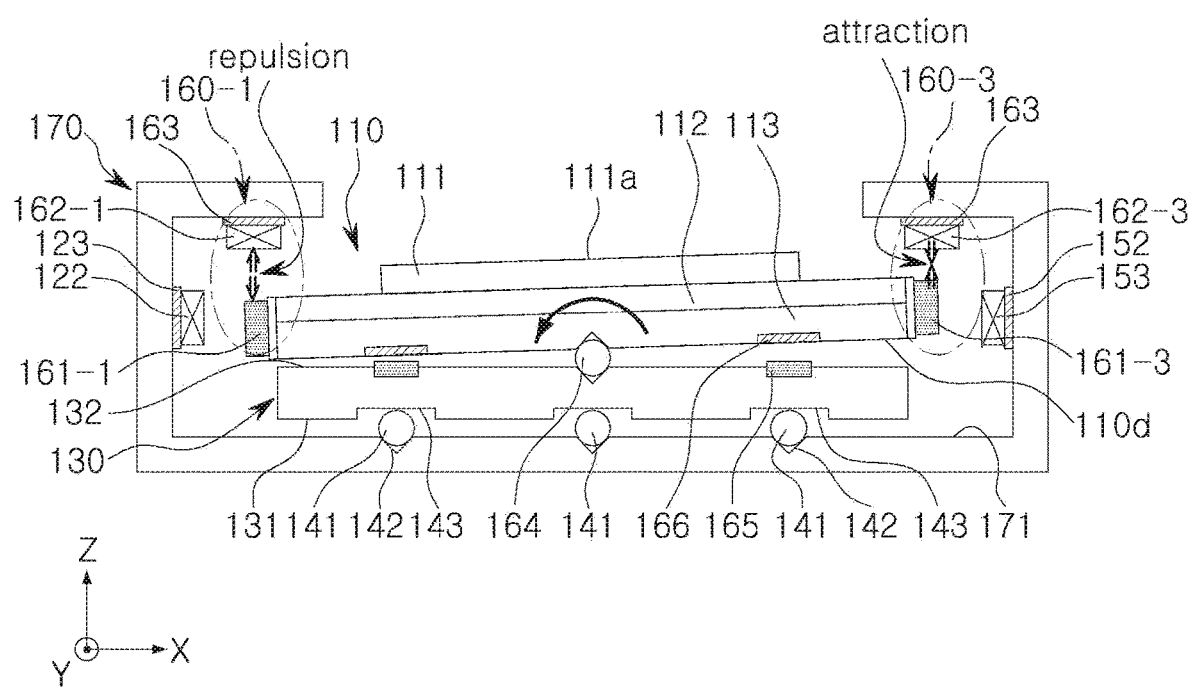
FIGS. 7A and 7B illustrate tilting of a first movable body due to a third OIS driver, in accordance with one or more embodiments.
Figure 7B:
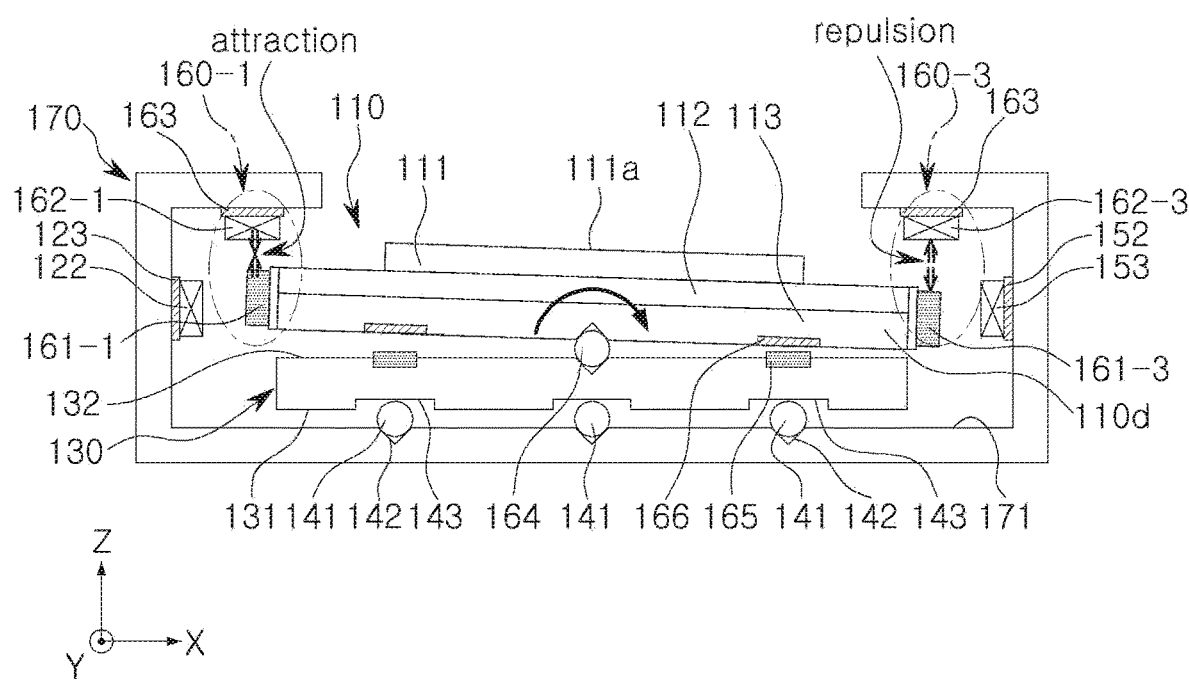

FIGS. 7A and 7B illustrate the tilting of a first movable body 130.

Referring to FIGS. 7A and 7B, the third OIS driver may rotate the image sensor about an axis orthogonal to the optical axis. For example, the third OIS driver may rotate the first movable body 130 or the second movable body 110 in a clockwise or counterclockwise direction with respect to the tilt guide ball 164.

FIGS. 7A and 7B illustrate a 3-1 actuator 160-1 and a 3-3 third actuator 160-3 responsible for rotation of the first movable body 130 in the first axis A1 direction (or Y-axis direction). Although not illustrated, the first movable body 130 may rotate about various axes (e.g., the first axis A1 or the second axis A2 in FIG. 2B) orthogonal to the optical axis by the plurality of third actuators including the 3-1 actuator 160-1 or the 3-3 actuator 160-3.

Referring to FIG. 7A, as a current is applied to the 3-1 driving coil 162-1, a repulsive force may be created between the 3-1 driving magnet 161-1 and the 3-1 driving coil 162-1, such that the first movable body 130 may rotate in a counterclockwise direction. Additionally, or alternatively, as a current is applied to the 3-3 driving coil 162-3, an attractive force may be created between the 3-3 driving magnet and the 3-3 driving coil 162-3, such that the first movable body 130 may rotate in a counterclockwise direction with respect to the fixed body 170.

Referring to FIG. 7B, as current is applied to the 3-1 driving coil 162-1, attractive force may be created between the 3-1 driving magnet 161-1 and the 3-1 driving coil 162-1, such that the first movable body 130 may rotate in a clockwise direction. Additionally, or alternatively, as a current is applied to the 3-3 driving coil 162-3, repulsive force may be created between the 3-3 driving magnet and the 3-3 driving coil 162-3, such that the first movable body 130 may rotate in a clockwise direction with respect to the fixed body 170.

In an example embodiment, one of the 3-1 actuator 160-1 or the 3-3 actuator 160-3 in the third OIS driver may not be provided. This is because the 3-1 actuator 160-1 and the 3-3 actuator 160-3 may rotate the first movable body 130 in a clockwise or counterclockwise direction.

According to the aforementioned example embodiments, the camera may provide an effective optical image stabilization operation with low power. Additionally, an excellent shaking correction function may be implemented by driving the image sensor in various directions.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A sensor shifting module, comprising:
   a fixed body;
   a first movable body movably disposed in the fixed body;
   a second movable body movably disposed on the first movable body, and configured to be coupled to an image sensor; and
   a first driver configured to move the first movable body in a direction orthogonal to a first direction with respect to the fixed body;
   a second driver configured to rotate the first movable body about an axis parallel to the first direction with respect to the fixed body; and
   a third driver configured to rotate the second movable body about an axis orthogonal to the first direction with respect to the first movable body.

2. The sensor shifting module of claim 1, wherein the image sensor is configured to have an imaging plane oriented in the first direction.

3. The sensor shifting module of claim 1, wherein at least one of the first driver and the second driver comprises supporting balls disposed between the fixed body and the first movable body.

4. The sensor shifting module of claim 1, wherein the third driver comprises a tilt guide ball disposed between the first movable body and the second movable body, and configured to provide a tilt center of the second movable body with respect to the first movable body.

5. The sensor shifting module of claim 1, wherein the first movable body is disposed between a lower surface of the second movable body and a bottom surface of the fixed body.

6. The sensor shifting module of claim 1, wherein the first driver comprises a first actuator, and the first actuator comprises a first driving magnet disposed on the second movable body, and a first driving coil disposed on the fixed body to oppose the first driving magnet in a direction perpendicular to the first direction.

7. The sensor shifting module of claim 6, wherein the second driver comprises a second actuator, and the second actuator comprises a second driving magnet disposed on the second movable body, and a second driving coil disposed on the fixed body to oppose the second driving magnet in a direction perpendicular to the first direction.

8. The sensor shifting module of claim 7, wherein the second movable body comprises four side surfaces which are formed in a quadrangular shape, and the first driving magnet and the second driving magnet are disposed on different side surfaces among the four side surfaces.

9. The sensor shifting module of claim 8, wherein the second movable body comprises a first side surface and a second side surface which form a corner, and the second driving magnet is disposed on one of the first side surface and the second side surface, and is disposed adjacent to the corner.

10. The sensor shifting module of claim 7, wherein the third driver comprises a third actuator, and the third actuator comprises a third driving magnet disposed on the second movable body, and a third driving coil disposed on the fixed body to oppose the third driving magnet in the first direction.

11. The sensor shifting module of claim 10, wherein the third driving magnet is one of the first driving magnet and the second driving magnet.

12. The sensor shifting module of claim 11, wherein the third driver comprises a first magnetic member and a second magnetic member disposed on the first movable body and the second movable body, respectively, and opposing each other in the first direction.

13. A camera module, comprising:
a lens module comprising at least one lens; and
a sensor shifting module,
wherein the sensor shifting module comprises:
a fixed body;
a first movable body movably disposed in the fixed body;
a second movable body movably disposed on the first movable body and configured to be coupled to an image sensor;
supporting balls disposed between the fixed body and the first movable body; and
a tilt guide ball disposed between the first movable body and the second movable body and configured to provide a tilt center of the second movable body with respect to the first movable body,
wherein the first movable body is configured to move on a plane perpendicular to the first direction while being supported by the supporting balls with respect to the fixed body, and
wherein the second movable body is configured to rotate about an axis perpendicular to the first direction while being supported by the tilt guide ball with respect to the first movable body.

14. The camera module of claim 13, wherein the image sensor is configured to have an imaging plane oriented in a first direction.

15. The camera module of claim 13, wherein the sensor shifting module further comprises:
a first driver configured to move the first movable body in a direction orthogonal to the first direction with respect to the fixed body;
a second driver configured to rotate the first movable body about an axis parallel to the first direction with respect to the fixed body; and
a third driver configured to rotate the second movable body about an axis orthogonal to the first direction with respect to the first movable body.

16. The camera module of claim 15, wherein the third driver comprises a third actuator disposed between the first movable body and the fixed body, and the third actuator comprises a third driving magnet disposed on the second movable body, and a third driving coil disposed on the fixed body to oppose the third driving magnet in the first direction.

17. The camera module of claim 16,
wherein one of the first driver and the second driver comprises a driving coil and a driving magnet opposing each other in a direction perpendicular to the first direction, and
wherein the driving magnet is the third driving magnet.

18. A sensor module, comprising:
a first movable body;
a second movable body configured to support an image sensor;
a first optical image stabilization (OIS) driver configured to move the image sensor in a direction orthogonal to an optical axis;
a second OIS driver configured to rotate the image sensor about an axis parallel to the optical axis; and
a third OIS driver configured to rotate the image sensor about an axis orthogonal to the optical axis, and configured to move the first movable body relative to a fixed body,
wherein the second movable body is movably disposed on the first movable body by a tilt guide ball.

19. The sensor module of claim 18, wherein:
the first OIS driver comprises a first driving magnet coupled to the second movable body and a first driving coil coupled to the fixed body,
the second OIS driver comprises a second driving magnet coupled to the second movable body and a second driving coil coupled to the fixed body, and
the third OIS driver comprises a third driving magnet coupled to the second movable body and a third driving coil coupled to the fixed body.

20. The sensor module of claim 19, further comprising a first position sensor disposed in the first driving coil, and a second position sensor disposed in the second driving coil.

* * * * *